United States Patent [19]

Doerk et al.

[11] 4,294,947

[45] Oct. 13, 1981

[54] PROCESS FOR THE PRODUCTION OF POWDERY, THERMOPLASTIC COPOLYMERS FROM ETHYLENE AND BUTENE-(1)

[75] Inventors: Klaus Doerk, Gladbeck; Klaus Koch, Kirchhellen; Horst Banke, Dorsten; Bernhard Toben, Schermbeck, all of Fed. Rep. of Germany

[73] Assignee: Chemische Werke Huls Aktiengesellschaft, Herne, Fed. Rep. of Germany

[21] Appl. No.: 90,408

[22] Filed: Nov. 1, 1979

[30] Foreign Application Priority Data

Nov. 4, 1978 [DE] Fed. Rep. of Germany ....... 2847986

[51] Int. Cl.$^3$ .......................... C08F 2/14; C08F 4/76
[52] U.S. Cl. ............................... 526/119; 252/429 A; 252/431 R; 428/402; 526/88; 526/142; 526/169.2; 526/348.6; 526/903
[58] Field of Search ............... 526/142, 903, 348.6, 526/119, 88, 169, 169.2

[56] References Cited

U.S. PATENT DOCUMENTS 2,929,807  3/1960  Leatherman et al. ............ 526/348.6

3,920,621 11/1975 Baxma nn et al. ................. 526/903

FOREIGN PATENT DOCUMENTS 862697  1/1978  Belgium .

*Primary Examiner*—Stanford M. Levin
*Attorney, Agent, or Firm*—Oblon, Fisher, Spivak, McClelland & Maier

[57] ABSTRACT

A process for the production of a powdery, thermoplastic copolymer of ethylene and butene-(1) having a density of up to about 0.930 g/cm$^3$ which comprises copolymerizing a mixture of ethylene and butene-(1) at 50°–95° C. and 10–100 bar in the presence of a catalyst which comprises (1) the reaction product of a chlorine and/or alkoxy-containing vanadyl (V) compound and an organic aluminum compound selected from the group consisting of ethyl aluminum dichloride, diethyl aluminum chloride, isobutyl aluminum dichloride, diisobutyl aluminum chloride, and mixtures thereof, and (2) an aluminum alkyl activating compound therefor, selected from the group consisting of aluminum trialkyls, alkyl aluminum sesquichloride, alkyl aluminum dichloride, and mixtures thereof, wherein the polymerization reaction is carried out in a solvent which comprises liquid butene-(1).

17 Claims, 1 Drawing Figure

PROCESS FOR THE PRODUCTION OF POWDERY, THERMOPLASTIC COPOLYMERS FROM ETHYLENE AND BUTENE-(1)

BACKGROUND OF THE INVENTION

The invention concerns a process for the production of thermoplastic low density copolymers of ethylene as workable powders with relatively high bulk densities through the copolymerization of ethylene and butene-(1) with the help of vanadium containing Ziegler catalysts.

BRIEF DESCRIPTION OF THE PRIOR ART

The production of ethylene polymers of a low density is customarily effected by the polymerization of ethylene with radical initiation under high pressures of 1,000 bar to 3,000 bar. These processes have, on the one hand, the disadvantage that the production of high pressures is technically cumbersome and expensive. Another disadvantage consists of the fact that no polymerisates can be produced according to such high pressures with such high molecular weights that they have satisfactory properties, such as, for example, a good tension crack resistance vis-a-vis surface-active media or high breaking strength with alternating bending stress and others. Therefore, the ethylene polymerisates produced according to the high pressure process cannot be applied in all fields of utilization due to their relatively low molecular weights.

Additionally, a process has become known for the production of low-density polyethylene with densities of 0.915 g/cm$^3$ to 0.930 g/cm$^3$ by means of copolymerization of ethylene with (1)-olefins in hexane at temperatures >130° C. This process has the disadvantage that the polymerisate is obtained dissolved in hexane and must be separated from the solvent.

Recently, a process has become known through the Belgian Pat. No. 862,697 with which powdery polymers with excellent properties for continued processing into finished parts can be produced from ethylene and, possibly, (1)-olefins as comonomers through polymerization with vanadium-containing catalysts in inert liquid hydrocarbons at temperatures of 50° C. to about 95° C. and pressures of 10 bar to 100 bar. Liquid inert hydrocarbons, preferably a hexane cut with a boiling range of 63° C. to 80° C., were mentioned as diluting medium for the polymerization. However, when using such diluting media, no powdery polymers of ethylene and butene-(1) can be produced with densities of about 0.900 g/cm$^3$ to about 0.930 g/cm$^3$. The polymers are actually obtained as chunks and lumps and cannot be handled in a technical system.

SUMMARY OF THE INVENTION

On the other hand, it has now been determined that copolymers of low densities of ethylene and butene-(1) can also be produced as fluid powder with relatively high bulk densities when using liquid butene-(1) as the diluting medium which can, possibly, also contain inert saturated and/or unsaturated C$_4$ hydrocarbons.

Therefore, the object of the invention is a process for the production of powdery, thermoplastic copolymers from ethylene and butene-(1) with densities of about 0.900 g/cm$^3$ up to about 0.930 g/cm$^3$, good fluidity of the powder, mean grain diameters of up to 1,000 μm and practically without fine grain portions, through polymerization of ethylene and butene-(1), if necessary, in the presence of hydrogen, in inert liquid hydrocarbons at temperatures between 50° C. and about 95° C. and pressures of 10 bar to 100 bar, preferably 20 bar to 60 bar, according to a discontinuous or continuous process by means of Ziegler catalysts, produced in inert liquid hydrocarbons through the reaction of chlorine- and alkoxy-containing vanadyl(V) compounds with aluminum-organic compounds, separation of the insoluble reaction product and activation with aluminum-organic compounds whereby, as a vanadyl(V) compound, a reaction product of vanadyl(V)-chloride and a vanadyl(V)-alcoholate is used at a mole ratio of 1 to 2 up to 2 to 1 or directly the reaction product of vanadyl(V)-chloride with an alcohol, preferably ethanol, propanol-(1), butanol-(1) in mole ratios of 1 to 2 up to 1 to 1 is used, and, as aluminum-organic compound for the reduction, is used ethylaluminum dichloride and/or diethylaluminum chloride, isobutyaluminum dichloride and/or diisobutylaluminum chloride in mole ratios of aluminum compounds to vanadium compounds of 1 to 1 up to 3 to 1 and the reaction of the vanadium compounds with the aluminum-organic compounds is effected by agitation with specific agitation outputs of 0.1 to 20,000 watts/m$^3$, preferably 1 to 5,000 watts/m$^3$, and the activation is effected with aluminumalkyl compounds of the formula AlR$_3$, whereby R represents hydrocarbon radicals with 2 to 8 C-atoms, or with alkylaluminum sesquichloride and/or alkylaluminum dichloride, particularly ethylaluminum sesquichloride and/or ethylaluminum dichloride, characterized by the fact that the polymerization is effected in liquid butene-(1), if necessary in the presence of additional inert, saturated and/or unsaturated C$_4$ hydrocarbons.

DESCRIPTION OF THE PREFERRED EMBODIMENTS

Figure 1:
FIG. 1 is a microphotograph of the powdery polymerisate produced in Example 3. Illustration Scale 16:1.

Preferably, according to the invention, the polymerization is effected using pure butene-(1). The commercial purity amounts of 99 percent. However, according to the invention, a C$_4$ cut can also be used which, for example, can contain, besides butene-(1), trans- and cis-butene-(2), isobutene, n-butane and isobutane. It is important that the added substances have an inert behavior towards the polymerization catalyst. Thus, the mixture should, for example, not contain any butadiene-(1,3) if possible which proved to be a catalyst poison. It goes without saying that attention is to be paid that the mole ratio of butene-(1) to ethylene, required for the desired density of the copolymers be maintained during the polymerization.

The process according to the invention under consideration offers, surprisingly, the possibility of also producing copolymers of ethylene and butene-(1) with the catalyst system known from the Belgian Pat. No. 862,697 having considerably lower densities than they are described in the Belgian Patent whereby the polymers are obtained suspended in the diluting medium and, after their separation from the suspension, are suitable for further processing into finished plastic parts after having added thereto the customary additives so that the otherwise necessary processing of the polymers into granulated material can be omitted. Since high outputs can be obtained with the catalysts used according to the invention, measures for the removal of the catalysts from the polymers can be omitted. Due to their high molecular weight, the low density copolymers produced according to the invention have excellent properties for technical applications. Thus, tubes produced from the copolymers obtained according to the invention have, besides their high flexibility required for certain applications, a high bursting strength and an excellent alternating bending strength. Sprayed die castings show an excellent surface gloss and have no inclination to shrink and distort. Sheeting made from the copolymers produced according to the invention shows a superior impact strength and stretch expansion.

The process according to the invention under consideration is illustrated by means of the following examples:

EXAMPLES 1-10

(a) Catalyst production 122.3 g (705.7 mMole) vanadyl(V)-chloride and 172.3 g (705.7 mMole) vanadyl(V)-n-propylate were heated together for 2 hours to 55° C. in 1.7 l of a hexane cut 63/80° C. under nitrogen. After the mixture had cooled down, a solution of 358.2 g (2,822.8 mMole) ethylaluminum dichloride in 1.43 l of the hexane cut 63/80° C., at 20° C. to 25° C., was added in the course of 2 hours by stirring with a flat blade paddle agitator and a specific agitation output of 126 watts/m$^3$. The suspension obtained was, subsequently, stirred for another 2 hours at 55° C. with the same specific agitation output. After it had cooled down, the solid substance was separated and washed five times, each time with 5 l of the hexane cut.

(b) Copolymerization of ethylene and butene-(1)

4 ml of a solution of triisobutylaluminum in hexane with a concentration of 100 g/l were pipetted into a 2-liter steel autoclave, under nitrogen. With water cooling, 600 g butene-(1) were pressed into the autoclave through a cartridge filled with a molecular sieve 3 Å (manufacturer: Union Carbide). Now the heating to the polymerization temperature is effected. For the removal of the nitrogen, 4 liters of gas were released through a gas meter. Then, hydrogen was pressed on and, subsequently, ethylene was added while stirring (1,000 rpm). A suspension of the catalyst components, described under (a), with a concentration of 10 g solid substance per liter hexane was charged into the autoclave through a sluice. With the completion of the polymerization time during which the polymerization temperature as well as the pressure were kept on a constant level by adding ethylene, the substance was cooled to room temperature and the excessive butene was released. Further details concerning the different examples can be taken from the following Tables 1 and 2.

TABLE 1

Copolymerization of ethylene and butene-(1)

| Example No. | Catalyst components according to (a) mg | $p_{H2}$ bar | $p_{total}$ bar | T °C. | t h | Yield g | Catalyst utilization kg Polymerisate / g Catalyst solid subst. | $J^1$ cm$^3$/g | Density$^2$ at 23° C. g/cm$^3$ | Bulk Density$^3$ g/cm$^3$ |
|---|---|---|---|---|---|---|---|---|---|---|
| 1 | 10 | 1.5 | 33 | 75 | 1 | 104 | 10.4 | 180 | 0.925 | 0.264 |
| 2 | 15 | 1.5 | 33 | 75 | 2 | 151 | 10.1 | 230 | 0.915 | 0.306 |
| 3 | 10 | 1.5 | 33 | 75 | 4 | 160 | 16.0 | 190 | 0.917 | 0.301 |
| 4 | 10 | 0.5 | 33 | 75 | 4 | 219 | 21.9 | 500 | 0.909 | 0.265 |
| 5 | 10 | 0.5 | 28 | 75 | 4 | 131 | 13.1 | 330 | 0.904 | 0.355 |
| 6[4] | 15 | 0.5 | 14 | 75 | 20 | 120 | 8.0 | 250 | 0.916 | 0.365 |
| 7 | 10 | 1.5 | 36 | 60 | 4 | 217 | 21.7 | 220 | 0.920 | 0.320 |
| 8 | 10 | 1.5 | 36 | 55 | 1 | 184 | 18.4 | 250 | 0.924 | 0.300 |
| 9 | 10 | 1.5 | 36 | 55 | 4 | 336 | 33.6 | 280 | 0.926 | 0.315 |
| 10 | 10 | 1.5 | 36 | 50 | 4 | 312 | 31.2 | 360 | 0.930 | 0.315 |

[1]Viscosity number according to DIN 53728
[2]DIN 53479
[3]DIN 53468
[4]Instead of 660 g butene-(1), a mixture of 103 g butene-(1), 148 g butene-(2), 210 g trans-butene-(2) and 234 g n-butane was used.

TABLE 2

Properties of the copolymer of Example 2

| Property | Measuring Method | | Unit | Value |
|---|---|---|---|---|
| Viscosity number J | ISO/R 1191-70 | DIN 53728 | cm$^3$/g | 230 |
| Molecular data | | | | |
| Mean molecular weight $\overline{M_v}$ | Solution viscosity c = 0.001 g/cm$^3$ | | | 90,000 |
| Mean molecular weight $\overline{M_w}$ | | | | 130,000 |
| $U = \dfrac{M_w}{M_n} - 1$ (GPC*) | | | | 20 |
| IR analysis C = C/1,000 C | | | | |
| vinyl | | | | 0.12 |
| trans | | | | 0.07 |
| vinylidene | | | | 0.06 |
| CH$_3$/1,000 C | | | | 46.1 |
| Melting index MF1 190/5 | ISO 1133 Procedure 5 | DIN 53735 | g/10 min. | 3.1 |
| Vicat fusing temp- | ISO 306- | DIN 53460 | °C. | 85 |

TABLE 2-continued

Properties of the copolymer of Example 2

| Property | Measuring Method | Unit | Value |
|---|---|---|---|
| erature | 1974 | Test Procedure A/50 | |
| Melting range | Differential Sclanning Calorimeter | Start 0° C. Max. 0° C. End 0° C. | 75 125 135 |
| Melting heat | as above | J/g | 60 |
| Density | ISO/R 1183 | DIN 53479 g/cm$^3$ | 0.915 |
| Stretch tension | ISO/R 527, Speed of feed C | DIN 53455 Speed of feed V | N/mm$^2$ 7 |
| Tearing strength | Test rod according to 111.2 | Test rod 4 | N/mm$^2$ 16 |
| Tearing stretch | | % | 850 |
| Ball pressure hardness | ISO 2039 (H 358/30) | DIN 53456 (H 358/30) | N/mm$^2$ 12 |
| Shore-A-hardness | | DIN 53505 | Shore-A-hardness units 95 |
| Modulus of shear at 23° C. | ISO/R 537 Method A | DIN 53445 | N/mm$^2$ 140 |

*Gel permeation chromatographic analysis

EXAMPLE 11

(a) Copolymerization of ethylene and butene-(1) according to the invention.

It was carried out analogous to Example 10. In deviation from it, a mixture of 79 g butene-(1), 228 g n-butene, 214 g trans-butene-(2), 148 g cis-butene-(2) was used a diluting agent. The quantity of the solid catalyst components amounted to 44 mg. The polymerization was already stopped after one hour. 55 g of a fluid powdery polymer were obtained. The properties are listed in Table 3.

(b) Comparative test

It was carried out as under 11(a) but with the difference that hexane 63/80° C. was used as diluting agent. The quantity of butene-(1) used amounted to 72 g, the ethylene partial pressure, as in Example 11(a) was 4.5 bar. The yield of polymer was 79 g and consisted of rough chunks or lumps.

TABLE 3

| Example | Viscosity number J DIN 53728 cm$^3$/g | Density DIN 53479 g/cm$^3$ | Bulk density DIN 53468 g/cm$^3$ | Fluidity velocity DIN 53492 cm$^3$/s |
|---|---|---|---|---|
| 11a | 130 | 0.920 | 0.335 | 4.7* |
| 11b Comparative Test | 230 | 0.922 | not determinable | not determinable |

*Diameter d of the discharge opening of the fluidity funnel: 10 mm

EXAMPLE 12

It was carried out analogous to Example 1. Instead of triisobutylaluminum, tri-n-octylaluminum was, however, used as co-catalyst. 2.2 ml of a solution in hexane were used with a concentration of 167 g tri-n-octylaluminum per liter. The quantity of the solid catalyst components amounted to 20 mg, the hydrogen partial pressure to 1.0 bar, the total pressure to 33 bar. The polymerization was effected over a period of 4 hours at 60° C. The polymer consisted of a fluid powder. Further details are contained in Table 4.

EXAMPLE 13

It was carried out as for Example 12. Instead of tri-n-octylaluminum, diethylaluminum chloride was, however, used, namely 2.2 ml of a solution in hexane with a concentration of 112 g diethylaluminum chloride per liter. The polymer consisted of a fluid powder. Further details are contained in Table 4.

TABLE 4

Copolymerization of ethylene and butene-(1)

| Example No. | Co-catalyst | Yield g | Catalyst utilization kg polymer / g catalyst solid substance | J$^1$ cm$^3$/g | Density$^2$ at 23° C. g/cm$^3$ | Bulk density$^3$ g/cm$^3$ |
|---|---|---|---|---|---|---|
| 12 | Tri-no-octyl-aluminum | 180 | 8.5 | 390 | 0.900 | 0.325 |
| 13 | Diethylalaminum chloride | 194 | 8.7 | 340 | 0.915 | 2.265 |

$^1$Viscosity number according to DIN 53728
$^2$DIN 53479
$^3$DIN 53468

What is new and intended to be secured by Letters Patent of the United States is:

1. A process for the production of a copolymer of ethylene and butene-(1) which comprises:
   copolymerizing a mixture of ethylene and butene-(1) at 50°–95° C. and 10–100 bar in the presence of a catalyst which comprises (1) the reaction product of a chlorine and/or alkoxy-containing vanadyl (V) compound and an organic aluminum compound selected from the group consisting of ethylaluminum dichloride, diethylaluminum chloride, isobutylaluminum dichloride, diisobutylaluminum chloride and mixtures thereof, and (2) an aluminum alkyl activating compound therefor selected from the group consisting of aluminum trialkyls, alkyl aluminum sesquichloride, alkyl aluminum dichloride, and mixtures thereof;

wherein the polymerization reaction is carried out in a solvent which comprises liquid butene-(1); thereby obtaining a fluid powdery copolymer having a density up to about 0.930 g/cm$^3$.

2. The process of claim 1, wherein the density of said copolymer is up to about 0.900 g/cm$^3$.

3. The process of claim 1, wherein the mean grain diameter of said copolymer is up to about 1000 μm.

4. The process of claim 1, wherein the pressure of said copolymerization is 20–60 bar.

5. The process of claim 1, wherein said copolymerization reaction is a continuous process.

6. The process of claim 1, wherein said copolymerization is a discontinuous process.

7. The process of claim 1, wherein said vanadyl (V) compound is the reaction product of vanadyl (V) chloride and vanadyl (V) alcoholate in a mole ratio of 1 to 2 up to 2 to 1.

8. The process of claim 1, wherein said vanadyl (V) compound is the reaction product of vanadyl (V) chloride with an alcohol in a mole ratio of 1 to 2 up to 1 to 1.

9. The process of claim 8, wherein said alcohol is selected from the group consisting of ethanol, propanol-(1), butanol-(1).

10. The process of claim 1, wherein said component (1) of said catalyst is prepared so that the molar ratio of organoaluminum compound to vanadium (V) compound is 1 to 1 up to 3 to 1.

11. The process of claim 1, wherein the reaction between said organoaluminum compound and said vanadium (V) compound to form said component (1) of said catalyst is carried out with a specific agitation output of 0.1 to 20,000 watts/m$^3$.

12. The process of claim 11, wherein said output is 1–5000 watts/m$^3$.

13. The process of claim 1, wherein said aluminum activating compound (2) is a trialkyl aluminum of the formula AlR$_3$ wherein R is an alkyl radical having 2–8 carbon atoms.

14. The process of claim 1, wherein said activating aluminum compound (2) is ethylaluminum sesquichloride.

15. The process of claim 1, wherein said activating aluminum compound (2) is ethylaluminum dichloride.

16. The process of claim 1, wherein said copolymerization solvent comprises butene-(1) in admixture with inert, saturated or unsaturated C$_4$ hydrocarbons or mixtures thereof.

17. The process of claim 16, wherein said solvent comprises a C$_4$-cut containing trans- and cis-butene (2), isobutene, n-butane and isobutane.

* * * * *